May 28, 1957 E. S. PURINGTON 2,794,124

OSCILLATOR

Filed Nov. 16, 1954

INVENTOR
ELLISON S. PURINGTON

BY [signature]
ATTORNEY 2,794,124
Patented May 28, 1957

2,794,124

OSCILLATOR

Ellison S. Purington, Gloucester, Mass., assignor to John Hays Hammond, Jr., Gloucester, Mass.

Application November 16, 1954, Serial No. 469,233
5 Claims. (Cl. 250—36)

This invention relates to electrical oscillators and has for an object to provide an oscillator having a high degree of amplitude and frequency stability.

Another object is to provide an oscillator which oscillates stably at the resonant frequency of the oscillating element without introducing non-linear loading.

Another object is to provide an oscillator having both square-wave and sine-wave outputs.

Another object is to provide an oscillator having improved characteristics.

Various other objects and advantages will be apparent as the nature of the invention is more fully disclosed.

In one embodiment the oscillator of the present invention includes a tuned element such as a tuned circuit or a piezo crystal which determines the frequency of oscillation, and is connected to an amplifier which is biased to operate on the linear portion of its characteristic curve (called a class A amplifier). The feed-back circuit includes a voltage-limiting circuit designed to produce a feedback voltage of constant amplitude. A second amplifier may be included in the feed-back circuit.

The feed-back voltage remains constant regardless of changes in frequency produced by adjustment in the tuned element and thus results in amplitude stability. Since the feed back introduces no reactive component of the fundamental frequency a high degree of frequency stability is also obtained.

Figure 1:
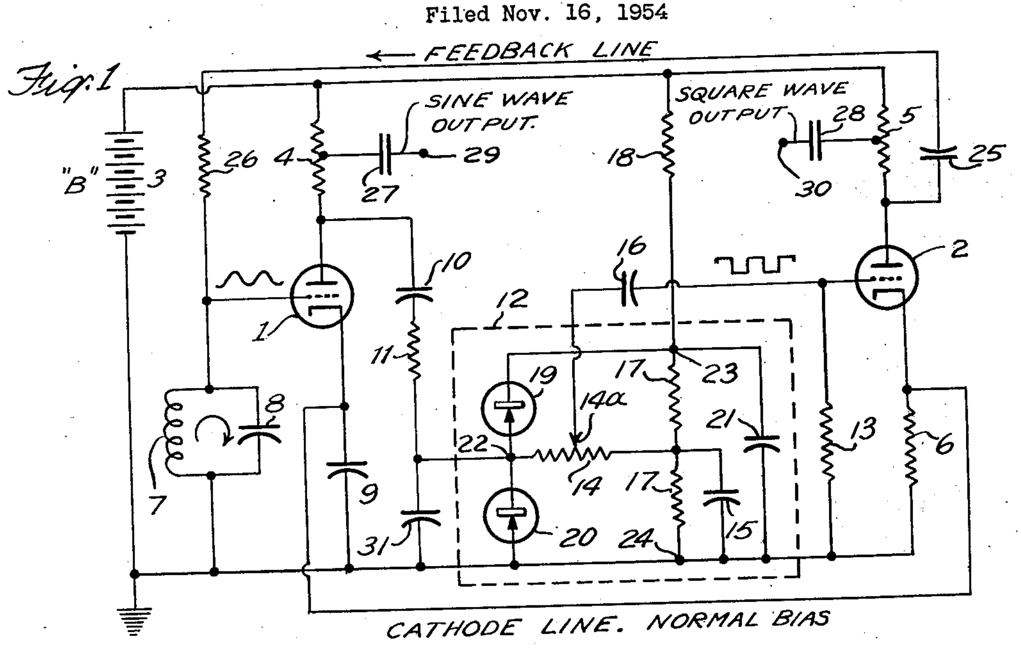
Figure 2:
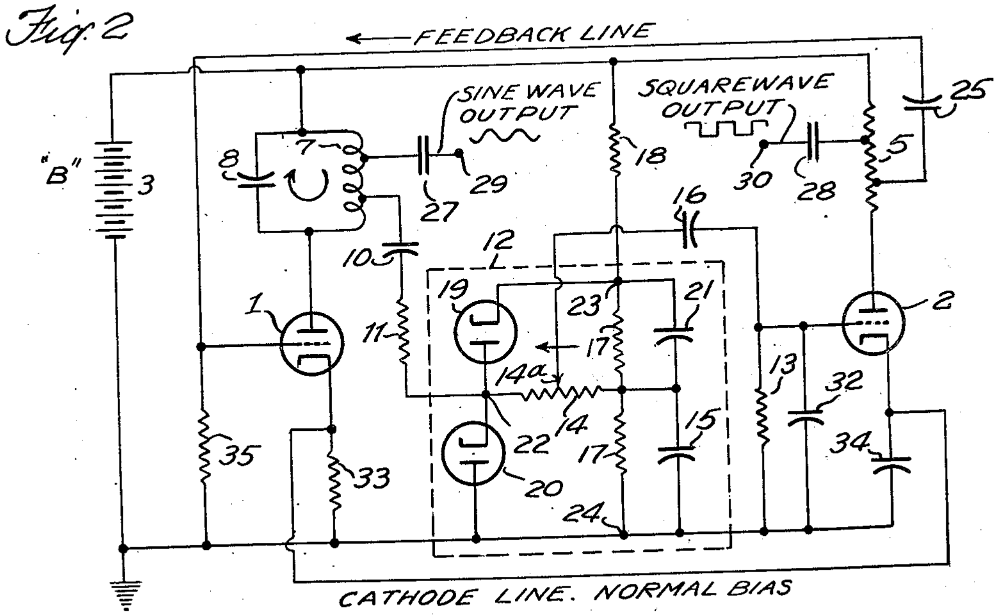

The nature of the invention as to its objects and advantages, the mode of its operation and the manner of its organization, may be better understood by referring to the following description, taken in connection with the accompanying drawings forming a part thereof, in which Fig. 1 is the circuit diagram of an oscillator embodying the present invention and Fig. 2 is a similar circuit diagram illustrating a further embodiment of the invention.

Like reference characters denote like parts in the two figures.

In the following description parts will be identified by specific names for convenience, but they are intended to be generic in their application to similar parts.

Referring to Fig. 1, tube 1 is the first amplifier, and tube 2 is the second amplifier. These may be triodes, tetrodes, or pentodes, and may be located in the same vacuum chamber as twin tubes. The plate current to the two tubes is supplied by source 3 through resistors 4 and 5, respectively. The combined plate currents of the two tubes returns to ground through resistor 6, the voltage across which furnishes the grid bias for both amplifiers and is sufficiently negative to prevent flow of grid current in either tube. Capacitor 9 furnishes a bypass around resistor 6 for alternating currents.

The oscillatory element, shown in Fig. 1 as comprising inductor 7 in parallel connection with capacitor 8, is connected in the cathode-to-grid circuit of amplifier 1.

The grid of the second amplifier 2 is driven from the plate of amplifier 1, through blocking capacitor 10, resistor 11, and through a square-wave limiting circuit to be described contained in block 12. The bias voltage of the grid of tube 2 is supplied through resistor 13.

The circuits in block 12 convert the sine-wave voltage taken from the plate of tube 1, into a square-wave voltage of fixed amplitude which appears across resistor 14. An adjustable fraction of this square-wave voltage across resistor 14 is fed to the grid of amplifier 2 through blocking capacitor 16.

The circuits within block 12 include two similar rectifiers 19 and 20 which may be diodes or crystal rectifiers or the equivalent. These rectifiers are connected in series in the same direction across a resistor 17. The resistor 17 is connected in series with a much larger resistance 18 across the steady-voltage plate supply 3. The mid tap of resistor 17 is connected through resistor 14 to the junction 22 between the rectifiers 19 and 20, which point is also connected to resistor 11. By-pass capacitors 21 and 15, connected across resistor 17, reduce the alternating voltages across each half of resistor 17 to negligible values. Resistor 14 is preferably of high resistance compared with that of resistor 17.

The operation of the circuits in block 12 is as follows: Rectifier 19 conducts and effectively connects junction 22 to the positive end 23 of the resistor 17, whenever the instantaneous value of the alternating voltage between point 22 and ground exceeds the steady voltage drop developed across one half of resistor 17. If, for example, the steady voltage drop across half of resistor 17 is ½ volt and the amplitude of the alternating voltage from point 22 to ground is 10 volts, the grid voltage of amplifier 2 is above its bias value by $n \times ½$ volts for 174 of the 180 degrees of the half period, where $n$ is the fraction of the voltage across resistor 14 tapped off by the adjustable contact 14a. Similarly during the second half period when rectifier 20 conducts, the grid voltage of amplifier 2 is $n \times ½$ volts below its bias value for 174 degrees of the 180 degrees of the second half cycle. The rectifiers 19 and 20 thus act as a switch hinged at junction 22 which alternately connects junction 22 to the positive end 23 or the negative end 24 of the resistor 17. The grid voltage of amplifier 2 is, therefore, essentially a square wave having an amplitude determined only by the position of contact 14a.

Power of square wave form is fed from the plate of amplifier 2 through blocking capacitor 25 and resistor 26 to the grid of amplifier 1, and hence to the oscillatory element connected between the grid and cathode.

A variable reactance 31 is connected between point 22 and ground for the purpose of correcting any phase difference between the power fed back and the alternating grid voltage of amplifier 1 which may be caused by reactive impedances in other portions of the feed-back coupling circuit.

The alternating component of plate current in resistor 4 is sinusoidal in form whereas the alternating component of current in resistor 5 is of square wave form. Sinusoidal output voltages can be taken through blocking capacitor 27 from terminal 29 to ground, and square-wave output can be taken through blocking capacitor 28 from terminal 30 to ground.

A shift of the tap 14a on resistor 14 varies the amplitude of the square-wave feed-back power and hence varies the amplitude of the oscillations in circuit 7—8.

The modified form of the invention shown in Fig. 2 differs from the form shown in Fig. 1 principally in the location of the oscillatory element. The oscillatory element, comprising inductor 7 in parallel with capacitor 8, is connected in the plate circuit of amplifier 1 in Fig. 2 and is replaced in the grid circuit by resistor 35.

In Fig. 2 bias resistance 33 and blocking capacitor 34 replaced capacitor 9 and resistor 6, respectively. Also bypass capacitor 21 of Fig. 1 is connected across one half of resistor 17. Phase correcting reactance 31 is omitted and its function is taken over by variable reactance 32 in the grid circuit of amplifier 2 in Fig. 2. Rectifiers 19 and 20 are shown as diodes. The other elements are identical with those of Fig. 1.

The general mode of operation of the circuit of Fig. 2 is the same as for the circuit of Fig. 1. There are, however, the following minor differences. The output power stored in circuit 7—8 is greater in the circuit of Fig. 2 because the amplifier 1 operates at a higher plate voltage than in Fig. 1 and delivers power directly to the oscillatory circuit. The grid voltage of amplifier 1 is a square wave instead of a sine wave. As a consequence the alternating component of the plate current of the first tube in Fig. 2 is more nearly a square wave than a sine wave, reducing somewhat the efficiency of conversion of steady power into alternating current power. Notwithstanding these minor differences in wave forms, the oscillations generated by the circuit of Fig. 2 possess substantially the same advantages of amplitude and frequency stability of the oscillation of Fig. 1.

What is claimed is:

1. A stable oscillator comprising a linear amplifier having input and output circuits, a tuned element in one of said circuits, a feedback amplifier having input and output circuits, a full-wave limiting circuit connected between the output circuit of said linear amplifier and the input circuit of said feedback amplifier, and means coupling the output circuit of said feedback amplifier to the input circuit of said linear amplifier, the coupling between the feedback amplifier output circuit and the input circuit of the linear amplifier being devoid of a space charge path and the energy fed back being of a phase such as to cause oscillations to be developed in said tuned element.

2. A stable oscillator comprising a linear amplifier having input and output circuits, a tuned element in said input circuit, a feedback amplifier having input and output circuits, a full-wave limiting circuit connected between the output circuit of said linear amplifier and the input circuit of said feedback amplifier, and means coupling the output circuit of said feedback amplifier to the input circuit of said linear amplifier, the coupling between the feedback amplifier output circuit and the input circuit of the linear amplifier being devoid of a space charge path and the energy fed back being of a phase such as to cause oscillations to be developed in said tuned element.

3. A stable oscillator comprising a linear amplifier having input and output circuits, a tuned element in said output circuit, a feedback amplifier having input and output circuits, a full-wave limiting circuit connected between the output circuit of said linear amplifier and the input circuit of said feedback amplifier, and means coupling the output circuit of said feedback amplifier to the input circuit of said linear amplifier, the coupling between the feedback amplifier output circuit and the input circuit of the linear amplifier being devoid of a space charge path and the energy fed back being of a phase such as to cause oscillations to be developed in said tuned element.

4. A stable oscillator comprising a linear amplifier having input and output circuits, a tuned element in one of said circuits, a feedback amplifier having input and output circuits, a full-wave limiting circuit connected between the output circuit of said linear amplifier and the input circuit of said feedback amplifier, means coupling the output circuit of said feedback amplifier to the input circuit of said linear amplifier, the coupling between the feedback amplifier output circuit and the input circuit of the linear amplifier being devoid of a space charge path and the energy fed back being of a phase such as to cause oscillations to be developed in said tuned element, means deriving a sine wave from the linear amplifier output circuit, and means deriving a square wave from the feedback amplifier output circuit.

5. A stable oscillator comprising a linear amplifier having input and output circuits, a tuned element in one of said circuits, a feedback amplifier having input and output circuits, a full-wave limiting circuit connected between the output circuit of said linear amplifier and the input circuit of said feedback amplifier, means adjusting the value of the voltage applied from said limiting circuit to the feedback amplifier input, and means coupling the output circuit of said feedback amplifier to the input circuit of said linear amplifier, the coupling between the feedback amplifier output circuit and the input circuit of the linear amplifier being devoid of a space charge path and the energy fed back being of a phase such as to cause oscillations to be developed in said tuned element.

References Cited in the file of this patent

UNITED STATES PATENTS

| | | |
|---|---|---|
| 2,444,349 | Harrison | June 29, 1948 |
| 2,524,710 | Miller | Oct. 3, 1950 |

FOREIGN PATENTS

| | | |
|---|---|---|
| 426,396 | Great Britain | Mar. 28, 1935 |